(12) United States Patent
Walker, III et al.

(10) Patent No.: US 8,724,598 B1
(45) Date of Patent: May 13, 2014

(54) METHOD FOR ENERGY-EFFICIENT, TRAFFIC-ADAPTIVE, FLOW-SPECIFIC MEDIUM ACCESS FOR WIRELESS NETWORKS

(75) Inventors: Thaddeus Owens Walker, III, Severna Park, MD (US); Murali Tummala, Monterey, CA (US); John Colin McEachen, Carmel, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 77 days.

(21) Appl. No.: 12/960,705

(22) Filed: Dec. 6, 2010

Related U.S. Application Data

(60) Provisional application No. 61/267,365, filed on Dec. 7, 2009.

(51) Int. Cl.
*H04W 72/04* (2009.01)
(52) U.S. Cl.
USPC ............................................ 370/337; 370/329
(58) Field of Classification Search
CPC ....... H04L 69/22; H04L 69/24; H04L 69/324; H04W 52/10; H04W 52/50; H04W 88/08; H04W 28/14; H04W 28/04; H04W 28/26; H04W 92/10; H04W 28/12; H04W 28/20; H04W 28/24; H04W 56/0045; H04W 74/04
USPC ............ 370/254–430; 725/125; 709/201–213
See application file for complete search history.

(56) References Cited

U.S. PATENT DOCUMENTS

| | | | | |
|---|---|---|---|---|
| 5,745,836 | A * | 4/1998 | Williams | 725/125 |
| 7,664,068 | B1 * | 2/2010 | Ho | 370/328 |
| 7,724,713 | B2 * | 5/2010 | Del Prado Pavon et al. | 370/338 |
| 8,320,340 | B2 * | 11/2012 | Sim et al. | 370/336 |
| 2002/0163933 | A1 * | 11/2002 | Benveniste | 370/465 |
| 2005/0180385 | A1 * | 8/2005 | Jeong et al. | 370/350 |
| 2006/0050742 | A1 * | 3/2006 | Grandhi et al. | 370/506 |
| 2008/0247376 | A1 * | 10/2008 | Del Prado Pavon et al. | 370/345 |
| 2009/0310573 | A1 * | 12/2009 | Sim et al. | 370/336 |
| 2009/0323611 | A1 * | 12/2009 | Singh et al. | 370/329 |
| 2011/0038343 | A1 * | 2/2011 | Bhatti et al. | 370/330 |
| 2012/0213166 | A1 * | 8/2012 | Benveniste | 370/329 |

OTHER PUBLICATIONS

Cooperative wireless sensors—MAC Protocol: IEE wireless conference (digital object identifier: 10.1109/WD.2008.4812841), pp. 1-5, Author Bastien et al, Publication Year 2008.*
Tanaka, Hiroto and Ushio, T., "Dynamics in a Controlled Flow Model of a Switching System." IEEE 2005, pp. 3379-3382.

* cited by examiner

*Primary Examiner* — Ayaz Sheikh
*Assistant Examiner* — Debebe Asefa
(74) *Attorney, Agent, or Firm* — Naval Postgraduate School; Lisa A. Norris (57) ABSTRACT

Energy-efficient, traffic-adaptive Cooperative Wireless Sensor Medium Access Control (CWS-MAC) is a traffic-adaptive, flow-specific medium access method capable of providing contention- or non-contention-based medium access service on a per flow basis.

5 Claims, 5 Drawing Sheets

METHOD FOR ENERGY-EFFICIENT, TRAFFIC-ADAPTIVE, FLOW-SPECIFIC MEDIUM ACCESS FOR WIRELESS NETWORKS

CROSS-REFERENCE TO RELATED APPLICATIONS

This application claims the benefit of U.S. Provisional Patent Application No. 61/267,365, filed Dec. 7, 2009, which is hereby incorporated in its entirety by reference.

BACKGROUND OF THE INVENTION

1. Field of the Invention

The present invention relates generally to wireless networks. More particularly, the invention relates to a medium access technique for wireless networks.

2. Description of the Related Art

Conventional wireless medium access solutions generally fall into two categories: contention-based and scheduled (also termed contention-free or non-contention based). It has been well established that the collision-free approach of scheduled schemes provides high throughput in high demand scenarios at the expense of overhead and packet delay. In comparison, contention-based approaches provide low delay times at low to moderate network loads, but performance begins to degrade rapidly as the load increases and the network becomes saturated.

Although initial work has been done in the wireless sensor network field to combine the benefits of both approaches in response to changing network load, no medium access scheme has been proposed that is capable of accommodating effectively and efficiently the multiple flows that exist in a wireless sensor network. While overall network performance may be optimized, individual flows may perform poorly in existing wireless sensor network medium access control solutions.

Carrier sense multiple access (CSMA) [KLE75] and its many variants are among some of the most widely studied proposals to provide contention-based medium access to wireless networks. They feature good throughput and delay performance at low to medium loads, but performance falls off rapidly as the load increases. Furthermore, the protocols are very energy-intensive and require nodes to constantly monitor the channel. The IEEE 802.11 standard [802.11] is built upon the slotted, non-persistent CMSA protocol and reflects these benefits and shortcomings.

The IEEE 802.15.4 standard [802.15.4] and Sensor-MAC (S-MAC) [YE04] are the most widely studied among a large group of contention-based medium access schemes that have been proposed for wireless sensor networks. IEEE 802.15.4 uses both slotted and unslotted CSMA and features a sleep cycle that improves energy efficiency. A contention-based solution, 802.15.4 reflects the same performance trends common to other CSMA-based approaches. Furthermore, it relies on a centralized controller to implement the sleep cycle. S-MAC provides a distributed solution to sleep cycle coordination, but still suffers from the fall off in performance at heavy loads.

Time division multiple access (TDMA) [LAM77] is a common contention-free approach to medium access. It performs well at high loads, but suffers from increased overhead and inefficient operation at low to medium loads. The Traffic-adaptive Medium Access (TRAMA) protocol [RAJ06] is a well-studied TDMA-based solution for wireless sensor networks that allows nodes to sleep through the use of a pre-schedule scheme but suffers from the inefficient operation at low to medium loads.

Finally, Z-MAC [RHE05] is the most well known of several hybrid approaches that have been proposed in the literature for wireless sensor networks. These hybrid solutions attempt to combine the performance of contention-based medium access approaches at low-to-moderate loads and non-contention-based approaches at high loads. Z-MAC uses a CSMA-based medium access scheme in the contention mode and a TDMA-based scheme in the non-contention mode. Energy savings are achieved utilizing a sleep schedule that is coordinated through preamble sampling. The salient shortfall in these hybrid approaches is that they treat the flows in aggregation rather than individually.

SUMMARY OF THE INVENTION

Energy-efficient, traffic-adaptive cooperative wireless sensor medium access control (CWS-MAC) is a traffic-adaptive, flow-specific medium access method for wireless networks capable of providing contention- or non-contention-based medium access service on a per flow basis.

In accordance with one embodiment, a method for medium access in a wireless communication network having one or more nodes includes: a contention-based medium access mechanism; and a non-contention-based Time Division Multiple Access (TDMA) framing scheme, wherein the contention-based medium access mechanism is superimposed on top of the TDMA framing scheme through the use of an interframe space and a contention beacon that give the contention-based flow global priority over the non-contention-based flow.

Embodiments in accordance with the invention are best understood by reference to the following detailed description when read in conjunction with the accompanying drawings.

Embodiments in accordance with the invention are further described herein with reference to the drawings.

DETAILED DESCRIPTION OF THE INVENTION

In one embodiment, the energy-efficient, traffic-adaptive cooperative wireless sensor medium access control (CWS-MAC) method is a flow-specific medium access method for wireless networks capable of providing contention- or non-contention-based medium access service on a per flow basis. Application-aware, it combines the low demand delay performance of a contention-based scheme with the high demand throughput performance of a non-contention (scheduled) approach and provides medium access service to flows on an individual basis. Energy-efficient operation is achieved by implementing an adaptive sleep cycle that makes use of a preamble sampling mechanism.

In one embodiment, the underlying non-contention-based medium access mechanism is provided by a TDMA scheme in which nodes are assigned slots within the TDMA frame for transmission of their non-contention flow packets. Slot assignment can be accomplished through a dynamic, distributed scheduling algorithm.

Figure 1:
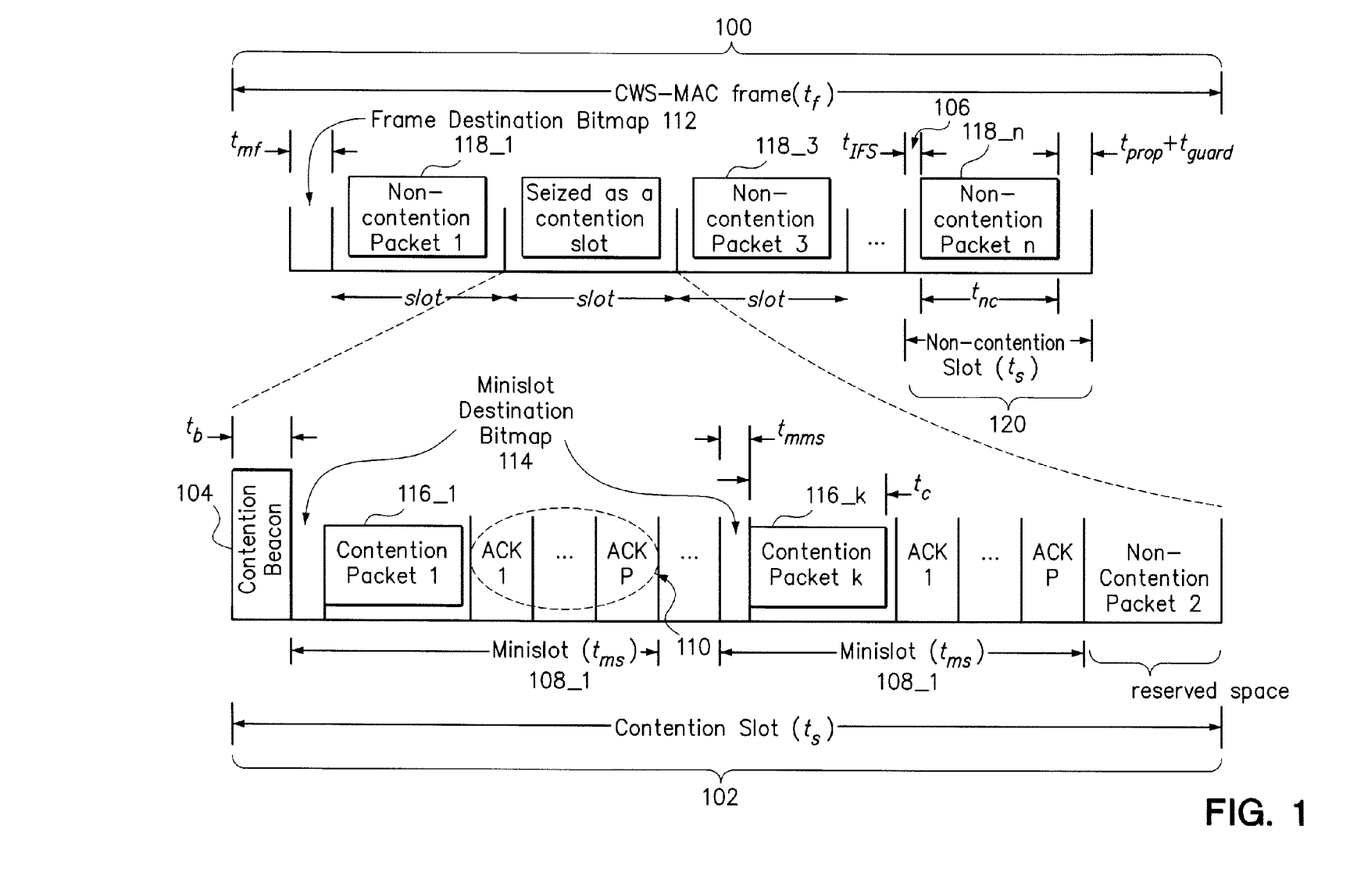
FIG. 1 is a diagram illustrating the energy-efficient, traffic-adaptive CWS-MAC frame in accordance with one embodiment.

FIG. 1 is a diagram illustrating an energy-efficient, traffic-adaptive CWS-MAC frame 100 in accordance with one embodiment. Referring to FIG. 1, the contention-based medium access mechanism is superimposed on TDMA framing through the use of an interframe space 106 and a contention beacon 104 that effectively give the contention-based flow global (across node) priority over the non-contention-based flow. A node, having one or more contention packets 116, illustrated as contention packets 116_1 through 116_k, to transmit, signals its intent to seize the current TDMA slot by transmitting a contention beacon 104 of length, $t_b$. In one embodiment, in a multi-hop network, contention beacon 104 is retransmitted to all two-hop neighbors of the originating node.

Differently, a node, having non-contention packets 118 to transmit in its TDMA slot, waits for the duration of interframe space 106, $t_{IFS}$, and then senses the medium. If the medium is free, i.e., no contention beacon 104 has been transmitted in its two-hop neighborhood, the node may transmit its non-contention packets 118, illustrated as non-contention packets 118_1 through 118_n. If a contention beacon 104 is detected, the slot owner defers and the slot is effectively seized as a contention slot 102.

To ensure the non-contention flow is not "choked off," a portion of the original TDMA slot is set aside, e.g., reserved, in contention slot 102 for use by the slot owner for non-contention packet transmission. From a bandwidth allocation viewpoint, this reserved portion of contention slot 102 bounds the minimum allocation allotted to the non-contention mode. In general, the bandwidth allocation between the contention and non-contention modes in energy-efficient, traffic-adaptive CWS-MAC is dynamic and responds to the contention packet arrival rate.

To reduce collisions among competing nodes with contention-based traffic to transmit within the two-hop neighborhood, contention slot 102 is subdivided into a series of transmission minislots 108, illustrated as minislots 108_1 through 108_k. A node transmits in a minislot 108 with a predetermined probability and an acknowledgement mechanism is included to recover from collisions, e.g., ACK(s) 110_1-110_P.

Assuming each flow (or each set of flows if a set of flows with similar characteristics is grouped together) has its own queue at each node, this queue size serves as an indicator of flow-specific traffic contention. As flow load reaches a predetermined threshold, measured in terms of the flow-specific queue size, the flow is switched from one access mode to another. Each flow (or each set of flows) will have its own queue and associated thresholds. These thresholds, $\theta_{1,f,m}$ and $\theta_{2,f,m}$, define a switching point and can be unique for each flow f and medium access mode m as shown in FIG. 2.

Figure 2:
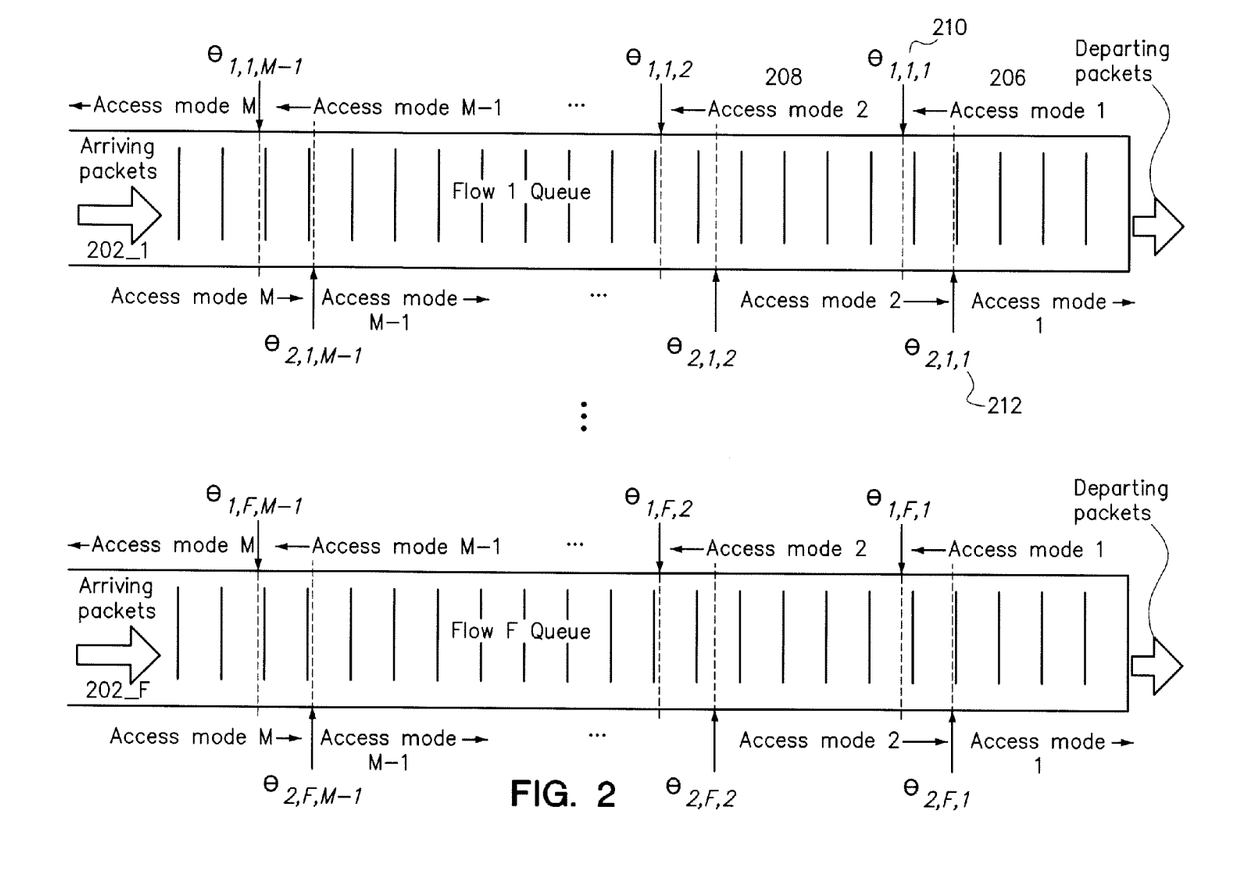
FIG. 2 is a diagram illustrating flow-specific queues and associated thresholds for the general energy-efficient, traffic-adaptive, flow-specific medium access for wireless networks method in accordance with one embodiment.

FIG. 2 is a diagram illustrating flow-specific queues and associated thresholds for the general energy-efficient, traffic-adaptive, flow-specific medium access for wireless networks method in accordance with one embodiment. FIG. 2 illustrates a plurality of flow queues 202, flow 1 queue 202_1 through flow F queue 202_F.

When a queue size for flow f queue 202_f reaches $\theta_{1,f,m}$, flow f is switched from mode m to mode m+1. Similarly, when the queue size for flow f queue 202_f drops to $\theta_{2,f,m}$, the flow is switched from mode m+1 back to mode m. As a specific example, flow 1 in FIG. 2 will transition from mode 1 206 to mode 2 208 when the number of packets in flow 1 queue 202_1 reaches $\theta_{1,1,1}$ 210. Similarly, flow 1 in FIG. 2 will transition from mode 2 208 to mode 1 206 when the number of packets in flow 1 queue 202_1 drops to $\theta_{2,1,1}$ 212.

The flow-specific queues 202 are maintained at the link layer, which implies a cross-layer solution in which the link layer mechanism is capable of determining which flow a packet is associated with. The queue size measurement for a flow queue 202 is taken whenever a packet is added or removed from the applicable flow queue 202. Although not required, this queue size measurement can be smoothed by applying a moving average to it. When a flow is transitioned from one mode to another, all queued packets within that flow are transitioned as well. This has the effect of "clearing" out the flow from the prior access mode and specifically improves delay and throughput recovery time when a flow is transitioned from one mode to another. In accordance with one embodiment, it should be noted that while a non-contention mode packet is removed from a flow queue upon transmission, a contention mode packet is not removed until the appropriate acknowledgement is received at the sender.

The distributed nature of energy-efficient, traffic-adaptive CWS-MAC allows neighboring nodes to assign the same flow to different medium access modes. This is because the flow transitions are based on local queue statistics, which will vary between neighboring nodes. This does not pose a problem in energy-efficient, traffic-adaptive CWS-MAC because the medium access mode is specific to the sender not the receiver and a receiver needs no prior arrangement to receive a flow in a given mode. Hence, although a node may receive a flow in one mode, it requires no coordination to switch to reception in another mode, and it is free to retransmit the flow in any existing mode.

Figure 3A:
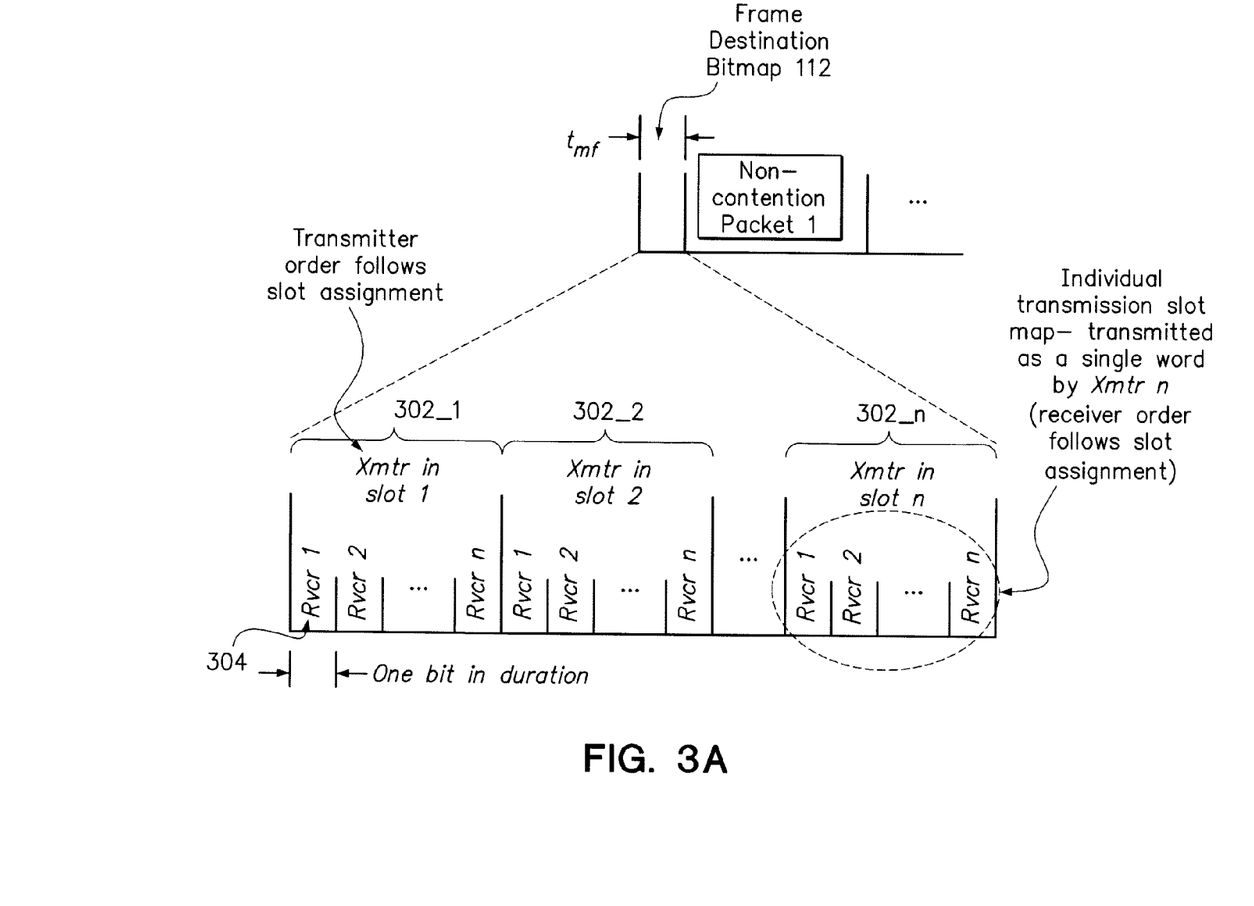
FIG. 3A is a diagram illustrating a frame destination bitmap in accordance with one embodiment.

FIG. 3A is a diagram illustrating frame destination bitmap 112 of FIG. 1 in accordance with one embodiment.

Referring now to FIGS. 1 and 3A together, to implement the energy-efficient operation, a frame destination bitmap 112 is added at the beginning of each frame 100 as shown in FIG. 3A. Frame destination bitmap 112 is used to identify the designated receivers in each transmission slot. In one embodiment, frame destination bitmap 112 is subdivided into first level slots 302, which correspond to the slots assigned in the transmission frame, herein termed transmission slot maps 302. Each individual transmission slot map 302 in frame destination bitmap 112 is further subdivided into second level slots 304 herein termed slot destination bitmap receiver bits 304 which identify the designated receiver(s) in that transmission slot (again corresponding to the slot structure of the transmission frame). Thus, for example, in FIG. 3A slot destination bitmap receiver bits 304_1 through 304_n designate the intended receiver(s) for transmission slot map 302_1.

Nodes wake up at the beginning of each transmission frame, e.g., frame 100, to receive the frame destination bitmap 112. Frame destination bitmap map 112 is created by the individual nodes who broadcast their transmission slot maps 302 at the appropriate time within frame destination bitmap 112. For a given node, this individual transmission slot map 302 identifies the receiver(s) for the upcoming transmission in the node's slot within the current transmission frame. Thus for example, in FIG. 3A slot destination bitmap receiver bits 304_1 through 304_n designate the intended receiver(s) for the transmission in slot 1.

A bit value of one (1) indicates that a specific node is an intended receiver for the transmission while a bit value of zero (0) indicates that it is not. A value of all zeroes in the transmission slot map 302 indicates that the owner of that slot does not have any non-contention traffic to transmit. The order of the bits corresponds to the slot assignment within the transmission frame. If a node is assigned to transmit in slot j within the frame, then bit j within the slot map is used to identify it as a potential receiver in that transmission slot. Note that a non-contention packet must arrive prior to the frame to be included in the frame destination bitmap 112 and, hence, be eligible for transmission in the current frame. Once frame destination bitmap 112 has been received and processed, nodes will know in which transmission slots they are designated as an intended receiver. In the non-contention mode, nodes enter the sleep state for the duration of transmission slots in which they are neither an intended receiver nor the slot owner with traffic to transmit.

Figure 3B:
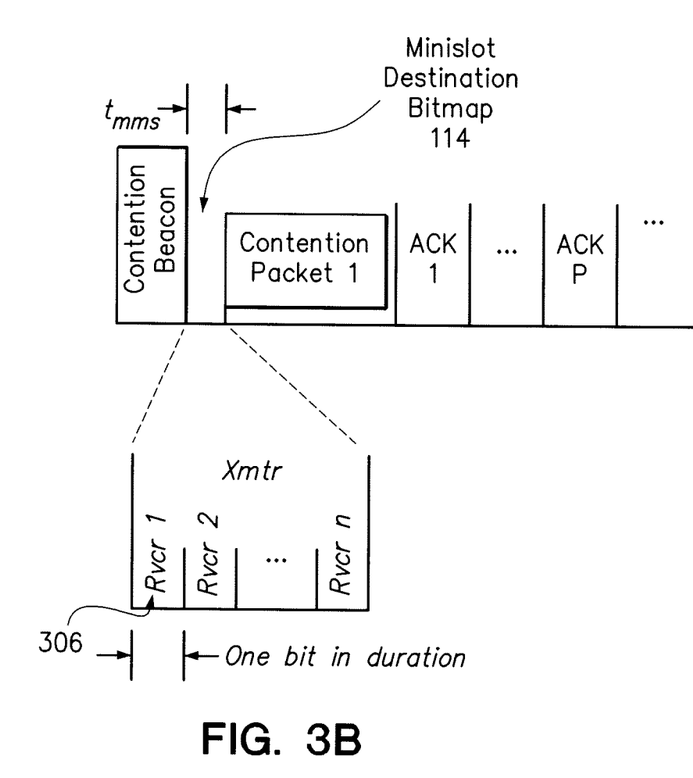
FIG. 3B is diagram illustrating a minislot destination bitmap in accordance with one embodiment.

FIG. 3B is diagram illustrating minislot destination bitmap 114 in accordance with one embodiment. Referring now to FIGS. 1 and 3B together, in one embodiment, a minislot destination bitmap 114 is also included at the beginning of each minislot 108 within a contention slot 102 as shown in FIG. 3B. Minislot destination bitmap 114 is used to designate the receiver(s) for the subsequent contention packet transmission in that minislot. Again using a bitmap approach, it includes a series of bits corresponding to each slot in the transmission frame, herein termed minislot destination bitmap receiver bits 306. These bits are used to designate the intended receiver(s), illustrated in FIG. 3B as minislot destination bitmap receiver bits 306_1 through 306_n.

To accommodate the contention mode, nodes will wake up with some probability $p_s$ (denoted as the preamble sampling parameter) to sample the channel in each transmission slot at time $t_{IFS}$ (relative to the slot boundary) for the presence of a contention beacon 104. When a contention beacon 104 is detected, the transmission slot is redesignated by the node as a contention slot 102. A value of $p_s=1$ represents the case where the node samples every transmission slot. A value of $p_s=0$ indicates that a node will only detect contention slots that occur when the node is either an intended receiver of the scheduled non-contention packet transmission or it is the slot owner and has non-contention traffic to transmit.

During a contention slot 102, a node that has detected the contention slot will wakeup at the beginning of each minislot 108 to receive the minislot destination bitmap 114 to determine whether or not it is an intended receiver for the subsequent contention traffic transmission in that minislot 108. Minislot destination bitmap 114 is broadcast by a node that intends to attempt transmission in that minislot 108. A node will stay awake for the subsequent contention packet transmission if it is designated as an intended receiver. A node is allowed to enter the sleep state until the next minislot if it is not the intended receiver or if minislot destination bitmap 114 is unreadable as a result of a collision due to multiple attempted transmissions in the minislot. Upon termination of the final minislot, a node will remain in (or return to) the sleep state unless it was the designated receiver (or transmitter) of non-contention packets in the original non-contention slot that was "seized." If this is the case, the node will wake up to receive (or transmit) non-contention packets during the non-contention period reserved at the end of contention slot 102.

The use of frame destination bitmap 112 ensures that a node will always be awake for the transmission of a non-contention packet for which it is the intended receiver. Similarly, the use of minislot destination bitmap 114 ensures that a node will always be awake for the transmission of a contention packet for which it is the intended receiver provided that it has detected contention slot 102. The probability that a node detects a contention slot 102 is a function of the probability $p_s$ that the node will sample for contention beacon 104. If a node fails to detect a contention slot 102, the node will sleep through the slot and will not receive any contention packets transmitted during that slot for which it is the intended receiver. The same acknowledgement mechanism that recovers from collisions within the contention slot can also be used to recover from packet losses due to missed contention slots.

It should be emphasized that the destination bitmap approach takes advantage of the existing slot structure used to support the non-contention mode of the protocol. While, the slot assignment process can be either distributed or centralized, the results must be disseminated to all nodes identified within the transmission frame.

Figure 4:
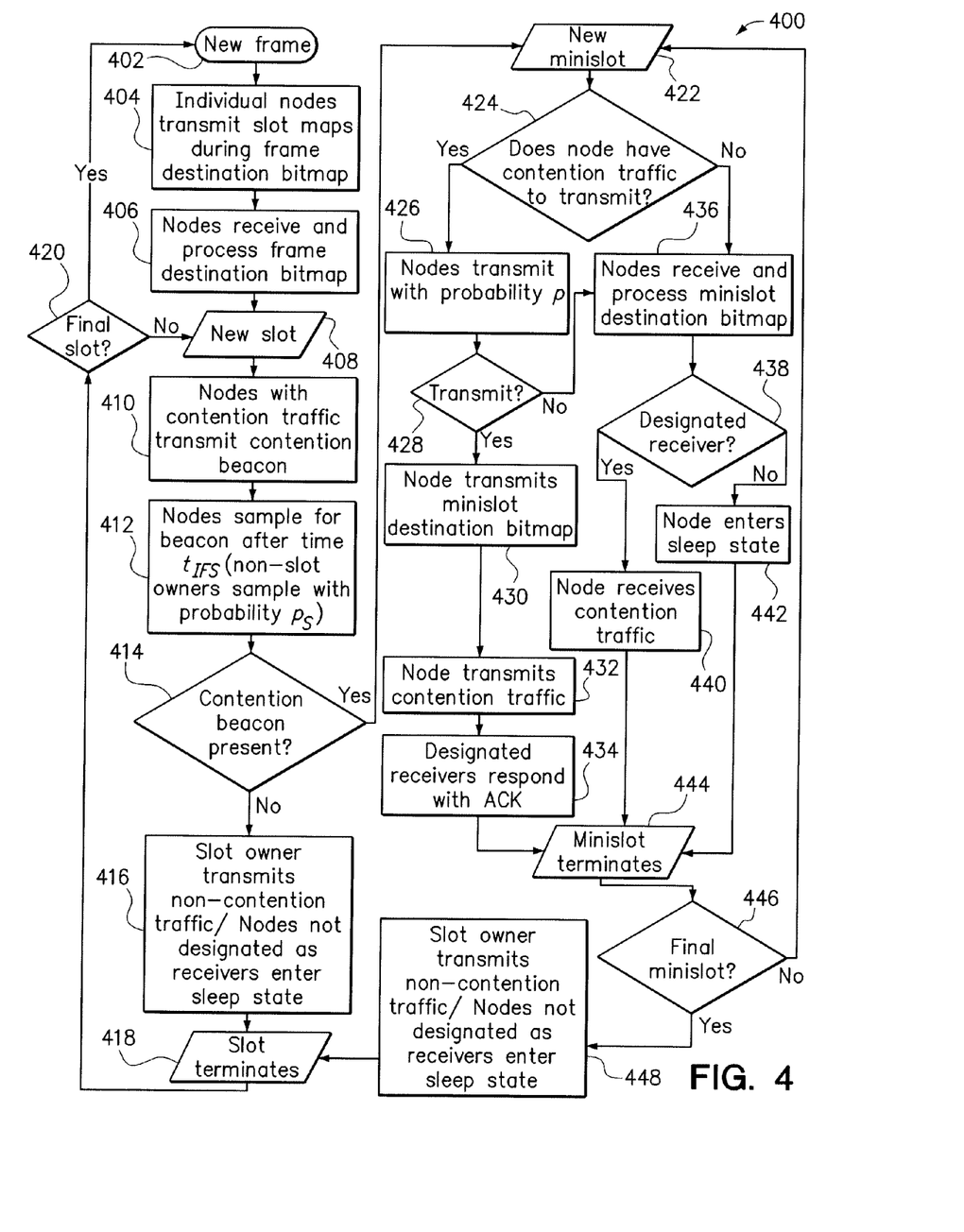
FIG. 4 is a flow diagram illustrating a method for energy-efficient, traffic-adaptive cooperative wireless sensor medium access control in accordance with one embodiment.

FIG. 4 is a flow diagram illustrating a method for energy-efficient, traffic-adaptive cooperative wireless sensor medium access control in accordance with one embodiment. Primary design parameters for energy-efficient, traffic-adaptive CWS-MAC include the slot size, $t_s$, the minislot size, $t_{ms}$, the number of minislots, k, preamble sampling parameter, $p_s$, and the lengths of the contention beacon 104 and interframe space 106. Referring now to FIGS. 1, 2, 3A, 3B, and 4 together, in operation 402, a new frame, for example frame 100, is received and processing continues to an operation 404. In operation 404, individual nodes transmit transmission slot maps 302 during frame destination bitmap 112 and processing continues to an operation 406.

In operation 406, individual nodes receive and process frame destination bit map 112. In operation 408, a new slot, for example slot 102, is received and processing continues to operation 410. On receipt of the new slot, in operation 410 nodes with contention traffic transmit a contention beacon, for example contention beacon 104. From operation 410 processing continues to operation 412. In operation 412, nodes sample for contention beacon 104 after time $t_{IFS}$. Non-slot owners sample with probability $p_s$. From operation 412, processing continues to a check operation 414.

In check operation 414, a determination is made whether contention beacon 104 is present. If contention beacon 104 is not present ("NO"), processing continues to an operation 416 and the slot owner transmits non-contention traffic. Nodes not designated as receivers enter a sleep state. From operation 416 processing continues to an operation 418 in which the slot terminates, and processing continues to a check operation 420.

In check operation 420, a determination is made whether the slot, e.g., slot 102, received in operation 408 is the final slot in the frame, e.g., frame 100. If the slot is the final slot in the frame ("YES"), processing continues to operation 402 with receipt of a next new frame with processing continuing to operation 404 as earlier described.

Referring back again to check operation 420, alternatively, if the slot is not the final slot in the frame ("NO"), processing continues to operation 408 with selection of a new slot in the frame, for example, the next slot in frame 100. From operation 408, processing continues to operation 410 as earlier described.

Referring back again to check operation 414, alternatively, if a contention beacon, e.g., contention beacon 104, is determined to be present ("YES"), from check operation 414, processing continues to operation 422 with a new minislot being received. From operation 422 processing continues to check operation 424 in which a determination is made whether a node has contention traffic to transmit.

If a node does not have contention traffic to transmit ("NO"), processing continues from check operation 424 to operation 436 with nodes receiving and processing the minislot destination bitmap, for example, minislot destination bitmap 114. From operation 436 processing continues to check operation 438 in which a determination is made whether the node is a designated receiver. If the node is a designated receiver ("YES"), from check operation 438 processing continues to operation 440 in which the node receives the contention traffic and the mini slot terminates at operation 444.

From operation 444 processing continues to check operation 446 in which a determination is made whether the minislot received in operation 422 is the final minislot in the slot. If the minislot is the final minislot in the slot ("YES"), processing continues to operation 448. In operation 448, the slot owner transmits non-contention traffic. Nodes not designated as receivers enter the sleep state. From operation 448 processing continues to operation 418 with the slot terminating and processing continuing to check operation 420 as earlier described.

Referring back again to check operation 446, alternatively, if the minislot is not the final minislot ("NO"), from check operation 446 processing continues to operation 422 with selection of a new minislot, i.e., a next minislot. From operation 422 processing continues to check operation 424 as earlier described.

Referring back again to check operation 438, alternatively, if the node is not a designated receiver ("NO"), from check operation 438 processing continues to operation 442 with the node entering a sleep state. From operation 442 processing continues to operation 444 with the minislot terminating as earlier described.

Referring back again to check operation 424, alternatively, if the node has contention traffic to transmit ("YES"), processing continues from check operation 424 to operation 426 with nodes transmitting with probability p. From operation 426 processing continues to check operation 428.

In check operation 428 a determination is made whether the node is ready to transmit. If the node is ready to transmit ("YES"), processing continues to operation 430 in which each node transmits a minislot destination bitmap, e.g., a minislot destination bitmap 114. From operation 430 processing continues to operation 432. In operation 432 the node transmits the contention traffic and the designated receivers respond with an acknowledgement (ACK). From operation 434 processing continues to operation 444. In operation 444, the minislot terminates and processing continues to check operation 446 as earlier described.

Referring back to check operation 428, alternatively, if it is determined the node is not ready to transmit ("NO"), processing continues to operation 436 with the node receiving and processing the minislot destination bitmap as earlier described.

In view of this disclosure, those of skill in the art can implement various embodiments of the present invention in a wide variety of configurations including a variety of physical hardware configurations using an operating system and computer programming language of interest to the user. This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

We claim:

1. A method for distributed medium access in a wireless communication network having one or more nodes comprising:
   receiving a first communication frame at a node, said communication frame having a frame destination bitmap, wherein said frame destination bitmap can be collectively transmitted by any one or more of said one or more nodes, and wherein said frame destination bitmap can designate any one or more of said one or more nodes as receiver(s);
   transmitting a slot map from said node during said frame destination bitmap of said first communication frame;
   receiving said frame destination bitmap at said node;
   receiving a first slot in said first communication frame, said first slot having a slot owner that is one of said one or more nodes;
   transmitting a contention beacon if said node has contention traffic;
   sampling for said contention beacon, wherein said nodes sample for said contention beacon after an interframe space time, $T_{IFS}$, and
   further wherein said non-slot owners sample with probability $p_s$;
   determining whether said contention beacon is present;
   wherein when said contention beacon is not present, said slot owner of said first slot transmitting non-contention traffic, if any, during said first slot;
   terminating said first slot;
   determining whether said first slot is a final slot in said first communication frame;
   wherein when said first slot is not said final slot, receiving a next slot in said first communication frame; and
   wherein when said first slot is said final slot, receiving a next communication frame.

2. The method of claim 1 further comprising:
   wherein when said slot owner transmits non-contention traffic, nodes not designated as receivers enter a sleep state.

3. The method of claim 1 wherein when said contention beacon is present, said method further comprising:
   receiving a first minislot in said first slot;
   determining whether said node has contention traffic to transmit;
   wherein when said node has contention traffic to transmit, said node transmitting a minislot destination bitmap identifying one or more designated receivers;
   transmitting said contention traffic with a probability p;
   receiving acknowledgement responses from said designated receivers; and
   terminating said first minislot.

4. The method of claim 3 further comprising:
   wherein when said node does not have contention traffic to transmit, receiving a minislot destination bitmap;
   determining whether said node is a designated receiver;
   wherein when said node is a designated receiver, said node receiving contention traffic, otherwise said node entering a sleep state;
   terminating said first minislot;
   determining if said first minislot is a final minislot in said first slot;
   wherein when said minislot is a final minislot, said slot owner transmitting non-contention traffic;
   terminating said first slot;
   determining whether said first slot is a final slot in said first communication frame;

wherein when said first slot is not said final slot, receiving a next slot; and wherein when said first slot is said final slot, receiving a next communication frame.

5. The method of claim 4 further comprising:

wherein when said minislot is a final minislot, nodes not designated as receivers entering a sleep state.

\* \* \* \* \*